US 6,653,828 B2

(12) United States Patent
Dordet et al.

(10) Patent No.: US 6,653,828 B2
(45) Date of Patent: Nov. 25, 2003

(54) ANALOG SENSOR FOR CONTACT-FREE ANGULAR OFFSET SENSING

(75) Inventors: Yves Dordet, Fonsorbes (FR); Bernard Genot, St. Marcel Paulel (FR); Luc Jansseune, Venerque (FR)

(73) Assignee: Siemens VDO Automotive, Toulouse (FR)

( * ) Notice: Subject to any disclaimer, the term of this patent is extended or adjusted under 35 U.S.C. 154(b) by 1 day.

(21) Appl. No.: 09/869,649

(22) PCT Filed: Nov. 30, 2000

(86) PCT No.: PCT/EP00/12059

§ 371 (c)(1),
(2), (4) Date: Jul. 2, 2001

(87) PCT Pub. No.: WO01/40736

PCT Pub. Date: Jun. 7, 2001

(65) Prior Publication Data

US 2002/0158627 A1 Oct. 31, 2002

(30) Foreign Application Priority Data

Dec. 1, 1999 (FR) .............................................. 99 15153

(51) Int. Cl.$^7$ .............................. G01D 5/20; G01B 7/30
(52) U.S. Cl. ............................... 324/207.15; 324/207.25
(58) Field of Search ...................... 324/207.17, 207.25, 324/207.15, 207.22, 173, 174, 207.21; 318/652, 653

(56) References Cited

U.S. PATENT DOCUMENTS 3,958,203 A    5/1976   Bernin
4,119,911 A *  10/1978  Johnson, Jr. ............ 324/207.21
5,293,124 A *  3/1994   Caillaut et al. ......... 324/207.22

FOREIGN PATENT DOCUMENTS

DE          39 14787        11/1990

* cited by examiner

Primary Examiner—Walter E. Snow
(74) Attorney, Agent, or Firm—Young & Thompson

(57) ABSTRACT

A contactless angular offset analog sensor, of the magnetic inductance type, includes a first portion forming a detector. The detector includes at least one substrate plate carrying at least one flat spiral winding, and at least one core layer of material with high magnetic permeability and low saturation field over at least one portion of the winding. The detector is adapted to coact with a device for processing the electrical signal measured at the terminals of the winding. The sensor also includes two rotors each having at least one magnet, disposed over a predetermined angular sector. The rotors are movable about a same axis identical to the axis of the winding. Each magnet generates in the plane of the core layer a magnetic field of a value greater than the saturation field of the core layer over at least a portion of the surface of the winding.

12 Claims, 2 Drawing Sheets

ANALOG SENSOR FOR CONTACT-FREE ANGULAR OFFSET SENSING

BACKGROUND OF THE INVENTION

The invention is in the field of sensors of position and movement. It relates in particular to a sensor used in the automotive field to measure relative angular displacement of two coaxial rotors, for example mounted on a same transmission shaft.

In the automotive field in particular, there exists a great need for knowing the parameters of operation of all the elements of the motor, for example the position of the controls, the position of the gear lever, the torque applied to the steering shaft, etc. A frequently utilized measurement, for example for the determination of a torque or the adjustment of a cam shaft timing device, is the angular offset between two coaxial shafts.

There is known for example from French patent application No. 99 09397, a magnetic sensor permitting measuring an angular offset between two shafts, applied to the measurement of a torque. However, this device requires, in the case of rotating shafts, an additional system for transmission of information, either by a rotating connector, or by a contactless transmission.

The present invention, which incorporates part of the disclosure of French patent applications Nos. 99 13436 and 99 13437, filed by the applicant, and which are incorporated herein by reference, has for its object to provide an angular offset sensor of a new type, which by its construction does not require such a transmission system.

SUMMARY OF THE INVENTION

To this end, the invention provides a contactless analog sensor of angular offset, of the magneto-inductive type, characterized in that it comprises:

a first portion forming a detector, comprising at least one substrate plate carrying at least one flat spiral winding, at least one core layer of a material of high magnetic permeability and low saturation field on at least one portion of said winding, the detector being adapted to coact with a device for processing the electric signal measured at the terminals of the winding, two rotors each comprising at least one magnet, disposed over a predetermined angular sector, the rotors being movable about a same axis identical to the axis of the winding, each magnet generating in the plane of the core layer a magnetic field of a value higher than the saturation field of said core layer over at least a portion of the surface of the winding.

The description and the drawings which follow permit better understanding the objects and advantages of the invention. It will be clear that this description is given only by way of example, and not in a limiting manner.

DETAILED DESCRIPTION OF THE PREFERRED EMBODIMENTS

The basic principle is the use of a winding forming an inductance, disposed on a thin substrate, sandwiched between two layers (or else a single one) of the mu metal material type (with a high magnetic permeability). In the description that follows, the term mu metal will be used to designate more generally materials having similar magnetic characteristics, which is to say high magnetic permeability for example about 100,000× that of air, and of low saturation field, for example 0.8 Tesla.

Mu metal behaves like an amplifier of the inductance L measured at the terminals of the winding (magnetic field storage effect).

When a magnet passes over the sheet of mu metal, its magnetic field causes a local saturation of said mu metal (of which care has been taken that it is selected such that it will be saturated by a relatively low field), which magnetic permeability declines on the saturated surface. There results a fall in the value of the inductance L, proportional to the winding surface covered by the saturated mu metal. This inductance drop is measurable using a device 12 at the terminals of said inductance, and an estimate of the surface area of the winding covered by the saturated mu metal can be derived from it.

There can also be used two windings disposed in parallel between the layers of mu metal, one supplied by an alternating voltage generator 10 supplying an alternating current, and the other connected to the terminals of a voltage measuring device 11. In this case, the coupling between the two windings is promoted by the presence of the mu metal. The saturation of this latter by the magnetic field of the magnet gives rise to a variation of this coupling, proportional to the surface of the winding covered by the saturated mu metal, which is measurable at the terminals of the second winding.

Similarly, there can be used two windings disposed in parallel, separated by a layer of mu metal, one supplied by an alternating current, and the other connected to the terminals of a voltage measuring device. The layer of mu metal plays the role of a screen and prevents coupling between the windings. The saturation of this screen layer by the magnetic field of the magnet, gives rise to a variation of this coupling, proportional to the surface of the winding covered by the saturated mu metal, which is measurable at the terminals of the second winding.

Figures 1, 2:
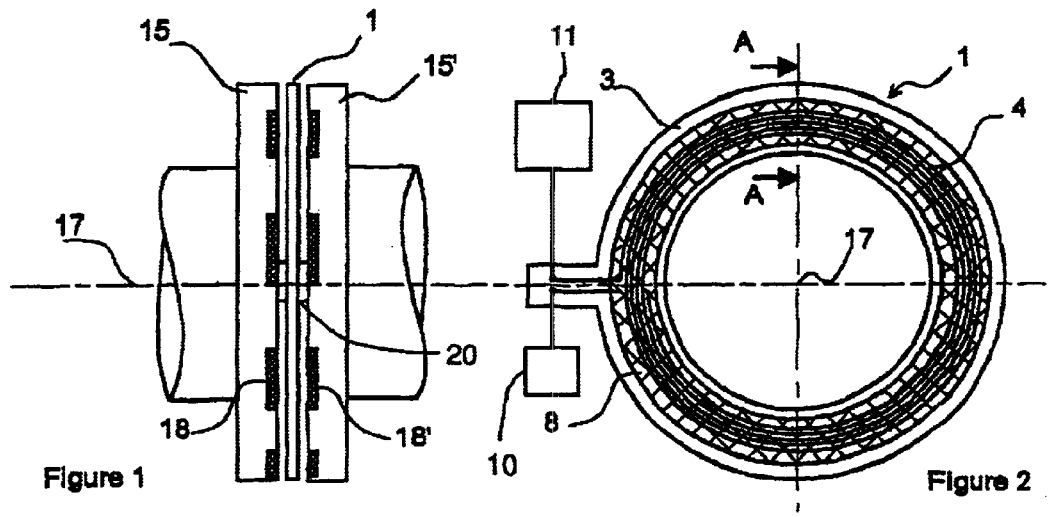
FIG. 1 shows an angular differential measuring sensor, seen from the side.
FIG. 2 shows the detector in plan view.

The overall arrangement of the sensor is shown in FIG. 1. A detector 1, fixed in rotation relative to an axis 17, is disposed between two rotors 15, 15', which angular offset is to be measured. These three elements are taken to be coaxial, with a common axis 17. The rotors 15 and 15' are provided with magnets 18, 18', disposed facing the detector 1.

As shown in FIG. 2, the detector 1 has an annular shape. It comprises, in the non-limiting example described here, a substrate 3 carrying a winding 4 and a core layer 8. The winding 4 is an elongated spiral, shaped in a circle having the common axis 17 at its center. Different embodiments of the detector are shown by means of FIGS. 3A and 3B showing fragmentary cross-sectional views of the detector on the line A—A of FIG. 2.

Figures 3A, 3B, 5:
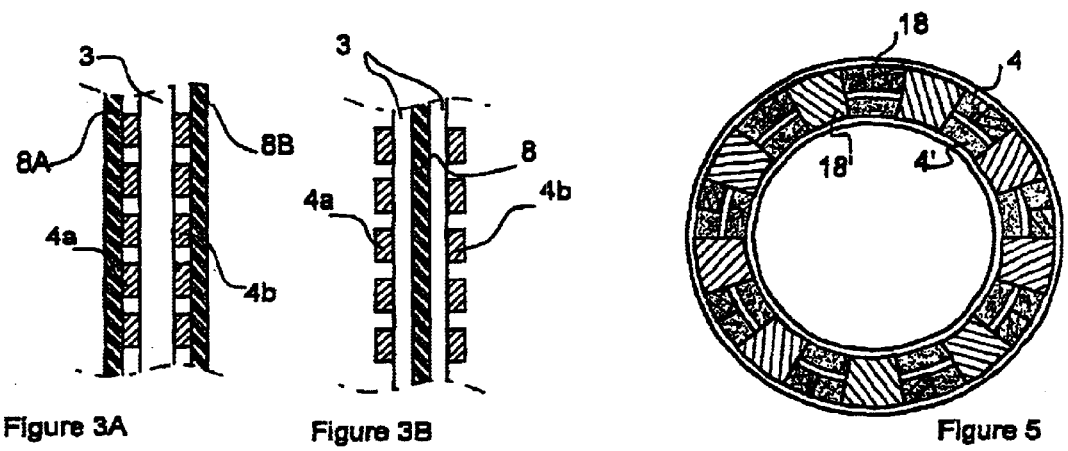
FIGS. 3A and 3B shows modified embodiments of the detector.
FIG. 5 shows a variant of the angular differential measuring sensor.

The detector shown in FIG. 3A can be made by a conventional production technology for printed circuits, of the double face or multi-layer type. A substrate 3, of epoxy glass, carries on each of its surfaces a spiral winding 4a, 4b, conventionally produced by copper circuit printing. A core layer, respectively 8A and 8B, is deposited on each winding, on the surface opposite the substrate. The core layers are made of a ferromagnetic material with high magnetic permeability and low saturation field, known for example by the commercial names Permaloy, Ultraperm or Finmec. These layers can be obtained by cutting out a thin layer of material, ring shaped and of respective external and internal diameter slightly greater (respectively less) than those of the windings. The core layers are electrically insulated from the windings by an insulating film (polyimide for example) and/or a layer of insulating glue (not shown).

In a first variant of this embodiment, the windings 4a and 4b are electrically connected in series to constitute the winding 4, and the variation of the inductance of the winding 4 is measured with a conventional electronic device.

In a second variant, one of the windings is supplied by an alternating current, and the other is connected to the terminals of a voltage measuring device and the coupling ratio between the two windings is determined.

In this embodiment of the detector 1, it is preferable to provide an electrical connection of the core layers with the electrical mass of the associated signal processing devices, the core layers thus performing a supplemental shielding function enabling reducing the influence of external electrical disturbances on the measurement.

In the second embodiment of the detector 1, shown in FIG. 3B, the windings 4a and 4b are each carried by a substrate plate 3. The two substrate plates sandwich between them, on the surface opposite the windings, a single core layer 8. In this embodiment again, the sensor used is of the inductance coupling type, such as described above, with a core layer separating two windings, one of which is an emitter and the other is a receiver. By using again in this case windings of 360°, and a core layer totally separating them, the relative angular displacement of the rotors supporting series of small magnets such as described below, produces a greater or lesser saturation of the core layer, and hence a greater or lesser coupling between the emitting winding and the receiving winding.

Each of the two rotors 15, 15' comprises a series of small magnets 18, 18' forming angular sectors (FIG. 4A), and for example nine magnets, of 20° angular sector each, separated by free angular segments 19, of 20°. The number and size of the angular sectors covered by the magnets are determined as a function of the range of angular offset to be measured.

Figures 4A, 4B, 4C:
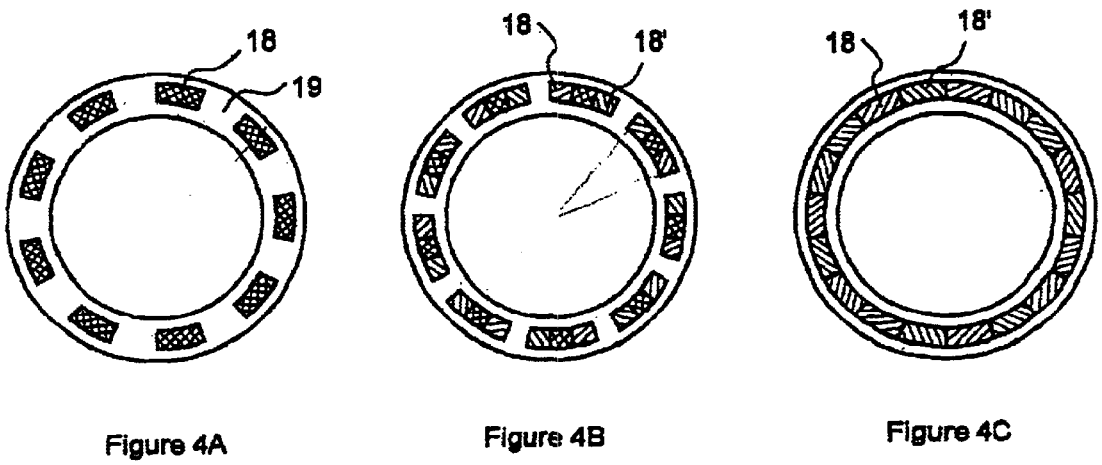
FIGS. 4A to 4C show the respective positions of the magnets attached to the two rotors with recovery rates of 50%, 75%, 100% respectively.
Figure 6:
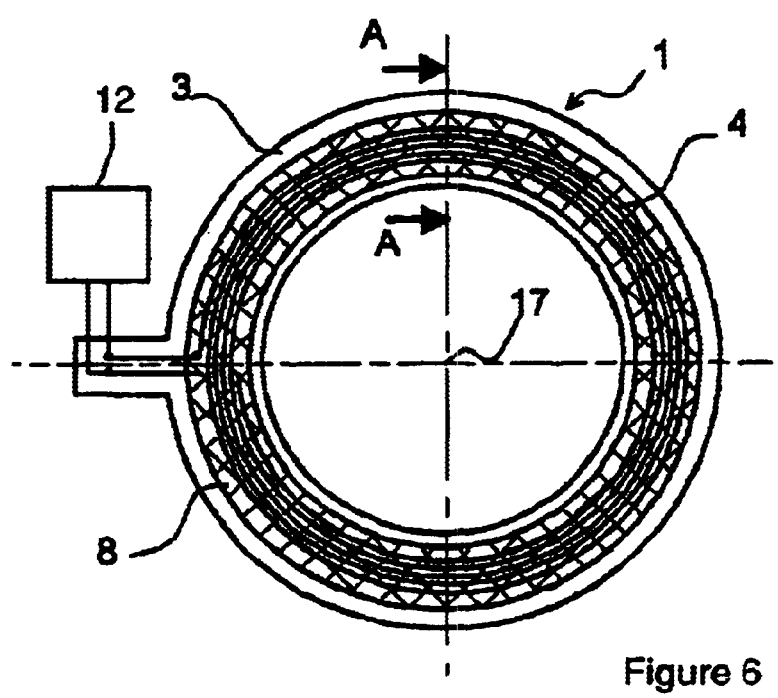
FIG. 6 shows the detector in plan view coacting with a device for processing the electrical signal.

FIGS. 4A to 4C show the respective positions of the magnets 18, 18' attached to the two rotors, according to the relative angular movement of the two rotors 15, 15'. When the two rotors, 15, 15' are exactly facing each other, the small magnets are disposed facing each other and in this case (FIG. 4A), 50% of the surface of the core layers 8A, 8B is saturated by the magnets. When an angular offset of 10° is created between the two rotors 15, 15', a saturation of 75% of the core layers 8A, 8B is obtained Finally, when there is an angular offset of 20° between the two rotors (FIG. 4C), all the surface of the core layers 8A, 8B is saturated by the magnets, and the inductance of the winding decreases substantially.

Such a device is particularly adapted to the measurement of small angles of angular offset, and in particular to the measurement of torque existing for example in a steering shaft, the rotors 15 and 15' being connected by a torsion bar 20 of known stiffness.

In a variant shown in FIG. 5, a second winding 4' is used, similarly to the first winding 4, inside or outside of the latter.

Only one of the two rotors 15, 15' comprises magnets facing this second winding 4. In this case, the inductance of this reference winding 4' does not change during absolute or relative movements of the two rotors 15, 15'. It permits serving as a reference, in an electronic half bridge assembly for example, so as to permit a compensation of the tolerances of distance between the rotors and the detector, as well as the tolerances of environmental conditions.

The scope of the present invention is not limited to the details of the shapes and embodiments considered above by way of example, but extends on the contrary to modifications within the reach of those skilled in the art. For example in the case of concentric shafts, the two rotors, in the form of thin plates, can be disposed on a same side of the detector (sensor at the end of the shaft) or else, by using a flexible substrate 3, the detector 1 can be arranged in the form of a cylinder with an axis of revolution 17 which is the same as that of the shafts, the magnets being thus shaped as tiles according to predetermined cylindrical sectors.

What is claimed is:

1. A contactless analog sensor of angular offset, comprising:

a first portion forming a detector, comprising at least one substrate plate carrying at least one flat spiral winding, at least one core layer of a material of high magnetic permeability and low saturation field, on at least a portion of said winding, the detector being adapted to coact with a device for processing the electric signal measured at the terminals of the winding, two rotors each comprising at least one magnet, disposed along a predetermined angular sector, the rotors being movable about a same axis identical to the axis of the winding, each magnet generating in the plane of the core layer a magnetic field of a value greater than the saturation field of said core layer over at least a portion of the surface of the winding, wherein the detector comprises two core layers on opposite sides of the winding.

2. Sensor according to claim 1, characterized in that the winding (4) comprises several parallel windings separated by insulating thicknesses.

3. Sensor according to claim 1, wherein the detector comprises two windings disposed on opposite sides of the substrate plate, one of the windings is connected to an alternating voltage generator and the other to a tension measuring device.

4. A contactless analog sensor of angular offset, comprising:

a first portion forming a detector, comprising at least one substrate plate carrying at least one flat spiral winding, at least one core layer of a material of high magnetic permeability and low saturation field, on at least a portion of said winding, the detector being adapted to coact with a device for processing the electric signal measured at the terminals of the winding, two rotors each comprising at least one magnet, disposed along a predetermined angular sector, the rotors being movable about a same axis identical to the axis of the winding, each magnet generating in the plane of the core layer a magnetic field of a value greater than the saturation field of said core layer over at least a portion of the surface of the winding, wherein the detector comprises two windings disposed on opposite sides of a single core layer, one of the windings is connected to an alternating voltage generator and the other to a voltage measuring device.

5. Sensor according to claim 1, wherein each rotor carries a series of identical magnets of a same angular sector, facing the winding, and separated by angular sectors of the same value.

6. Sensor according to claim 1, wherein the detector also comprises a reference winding, coaxial with the first winding, principally without overlapping the latter, and that only one of the rotors comprises magnets facing this reference winding.

7. Sensor according to claim 1, wherein the magnetic permeability of the core layer is about 100,000 times that of air, and the saturation field is about 0.8 Tesla.

8. Sensor according to claim 1, wherein each core layer is electrically connected to the ground of the signal processing device.

9. Sensor according to claim 1, for the measurement of a torque, wherein the rotors are interconnected by a torsion bar of predetermined stiffness.

10. A contactless analog sensor of angular offset, comprising:
a detector having at least one substrate plate carrying at least one flat spiral winding, and at least one core layer having a magnetic permeability of about 100,000 times a magnetic permeability of air on at least a portion of said winding;
a device for processing an electric signal connected to terminals of the winding; and
two rotors, each of said two rotors having at least one magnet, disposed along a predetermined angular sector, the rotors being movable about a same axis identical to an axis of the winding,
wherein the at least one flat spiral winding, the at least one core layer, and the at least one magnet are structured and arranged so that when each said magnet passes over the at least one core layer, a magnetic field of the magnet causes a local saturation of the at least one core layer, so that an inductance of the at least one core layer at an area of said local saturation decreases.

11. The sensor as claimed in claim 10, wherein the detector comprises two windings, one of said two windings being connected to an alternating voltage generator and another one of said two windings being connected to a voltage measuring device.

12. The sensor as claimed in claim 10, wherein the core layer has a saturation field of about 0.8 Tesla.

* * * * *